(12) United States Patent
Ejderklint

(10) Patent No.: US 9,004,823 B2
(45) Date of Patent: Apr. 14, 2015

(54) FAMILY OF ROTATING CUTTING TOOLS

(75) Inventor: Christer Ejderklint, Fargersta (SE)

(73) Assignee: Seco Tools AB, Fagersta (SE)

( * ) Notice: Subject to any disclaimer, the term of this patent is extended or adjusted under 35 U.S.C. 154(b) by 79 days.

(21) Appl. No.: 13/254,413

(22) PCT Filed: Mar. 1, 2010

(86) PCT No.: PCT/SE2010/050235
§ 371 (c)(1),
(2), (4) Date: Sep. 19, 2011

(87) PCT Pub. No.: WO2010/101517
PCT Pub. Date: Sep. 10, 2010

(65) Prior Publication Data
US 2012/0003052 A1    Jan. 5, 2012

(30) Foreign Application Priority Data

Mar. 5, 2009 (SE) .................................. 0950124-8
Mar. 6, 2009 (SE) .................................. 0900285-8

(51) Int. Cl.
*B23C 5/20* (2006.01)
*B23D 61/06* (2006.01)
*B23C 5/08* (2006.01)

(52) U.S. Cl.
CPC .......... B23D 61/06 (2013.01); *Y10T 407/1942* (2015.01); *Y10T 407/2274* (2015.01); *Y10T 407/235* (2015.01); *Y10T 407/22* (2015.01); *Y10T 407/191* (2015.01); *Y10T 407/23* (2015.01); *Y10T 407/1908* (2015.01); *Y10T 407/1952* (2015.01); B23C 5/08 (2013.01);

(Continued)

(58) Field of Classification Search
USPC .................. 407/56, 58, 61, 51, 42, 34, 40, 48
See application file for complete search history.

(56) References Cited

U.S. PATENT DOCUMENTS 3,540,323 A * 11/1970 Rishel ............................ 408/186
5,145,294 A *  9/1992 Flueckiger ...................... 407/42

(Continued)

FOREIGN PATENT DOCUMENTS

DE    197 43 971 A1    4/1999
DE    101 44 734 A1    3/2003

(Continued)

OTHER PUBLICATIONS

Drozda et al., Tool and Manufacturing Engineers Handbook, 1983, TMEH, Fourth Edition vol. 1, pp. 31-40.*

(Continued)

*Primary Examiner* — Daniel Howell
*Assistant Examiner* — Nicole N Ramos
(74) *Attorney, Agent, or Firm* — WRB-IP LLP

(57) ABSTRACT

A family of rotating cutting tools includes at least two toolholders having different diameters, each toolholder including a first side and a second side, the first side and the second side being substantially perpendicular to an axis of rotation of the toolholder, and at least one insert abutment surface on each of the first side and the second side. For each toolholder, the insert abutment surfaces on the first and second sides define an angle with a plane perpendicular to the axis of rotation of the toolholder, and the angle defined by the insert abutment surfaces and the plane perpendicular to the axis of rotation of the toolholder is different for the at least two toolholders having different diameters.

15 Claims, 5 Drawing Sheets

(52) U.S. Cl.
CPC ........... *B23C 5/202* (2013.01); *B23C 2200/081* (2013.01); *B23C 2200/201* (2013.01); *B23C 2200/208* (2013.01); *B23C 2200/367* (2013.01); *B23C 2210/203* (2013.01); *B23C 2210/204* (2013.01)

(56) References Cited

U.S. PATENT DOCUMENTS

| | | | |
|---|---|---|---|
| 6,769,842 B2* | 8/2004 | Nerlich et al. | 407/61 |
| 6,805,520 B2* | 10/2004 | Gesell et al. | 407/113 |
| 7,121,769 B2* | 10/2006 | Satran et al. | 407/40 |
| 7,153,068 B2* | 12/2006 | Satran et al. | 407/66 |
| 2006/0236517 A1* | 10/2006 | Satran et al. | 29/428 |
| 2008/0003067 A1* | 1/2008 | Ejderklint et al. | 407/40 |

FOREIGN PATENT DOCUMENTS

| | | |
|---|---|---|
| JP | 2001-38517 | 2/2001 |
| JP | 2001062624 A * | 3/2001 |
| WO | 99/17899 | 4/1999 |
| WO | 01/94065 A1 | 12/2001 |

OTHER PUBLICATIONS

International Search Report issued on May 24, 2010 in International Application No. PCT/SE2010/050235 filed Mar. 1, 2010.

* cited by examiner

FAMILY OF ROTATING CUTTING TOOLS

CROSS REFERENCE TO RELATED APPLICATIONS

This application is a §371 National Stage Application of PCT International Application No. PCT/SE2010/050235, filed Mar. 1, 2010, and claims priority under 35 U.S.C. §119 and/or §365 to Swedish Application No. 0950124-8 filed Mar. 5, 2009 and Swedish Application No. 0900285-8 filed Mar. 6, 2009.

BACKGROUND AND SUMMARY

The present invention relates generally to cutting tools comprising on-edge mounted cutting inserts and, more particularly, to a family of such cutting tools.

In slot-milling cutters, the periphery of the milling body is equipped with a number of on-edge mounted cutting inserts, every second one of which protrudes in relation to one side of the toolholder and every second from the opposite side of the toolholder. The relative displacement of the cutting inserts is made in order to obtain clearance and in order to obtain slots having perpendicular or parallel bordering surfaces. The bottom surface of the slot is cut by the major cutting edges of the cutting inserts while the side surfaces of the slot are cut by the minor cutting edges extending substantially perpendicularly to the major cutting edges. Radii between the bottom surface and the side surfaces are obtained by means of more or less rounded cutting corners at a transition between associated pairs of major and minor cutting edges of each cutting insert. The relative displacement of the cutting inserts requires that the cutting inserts are formed in particular right hand and left hand embodiments in order to guarantee the requisite clearance between the side wall and the portion of the cutting insert following after the minor cutting edge.

It is desirable to provide an on-edge mounted cutting insert and a cutting tool wherein a single insert can be mounted on either side of a toolholder.

According to an aspect of the present invention, a family of rotating cutting tools comprises at least two toolholders having different diameters, each toolholder comprising a first side and a second side, the first side and the second side being substantially perpendicular to an axis of rotation of the toolholder, and at least one insert abutment surface on each of the first side and the second side, the insert abutment surfaces on the first side and the second side of each toolholder being substantially mirror images of each other, and the insert abutment surfaces on each of the first side and the second side of each toolholder being substantially identical to the insert abutment surfaces on each other one of the at least two toolholders, and a plurality of identical inserts mounted on each of the at least two toolholders, each insert having a first side surface, a second side surface, and a plurality of edge surfaces between the first and second side surfaces, each edge surface intersecting with another edge surface at a corner and forming a cutting edge, wherein the first and second side surfaces each have a side insert supporting surface for abutting against one of the abutment surfaces. For each toolholder, the insert abutment surfaces on the first and second sides define an angle with a plane perpendicular to the axis of rotation of the toolholder, and the angle defined by the insert abutment surfaces and the plane perpendicular to the axis of rotation of the toolholder is different for the at least two toolholders having different diameters.

BRIEF DESCRIPTION OF THE DRAWING

The features and advantages of the present invention are well understood by reading the following detailed description in conjunction with the drawing in which like numerals indicate similar elements and in which.

DETAILED DESCRIPTION

Figure 1:
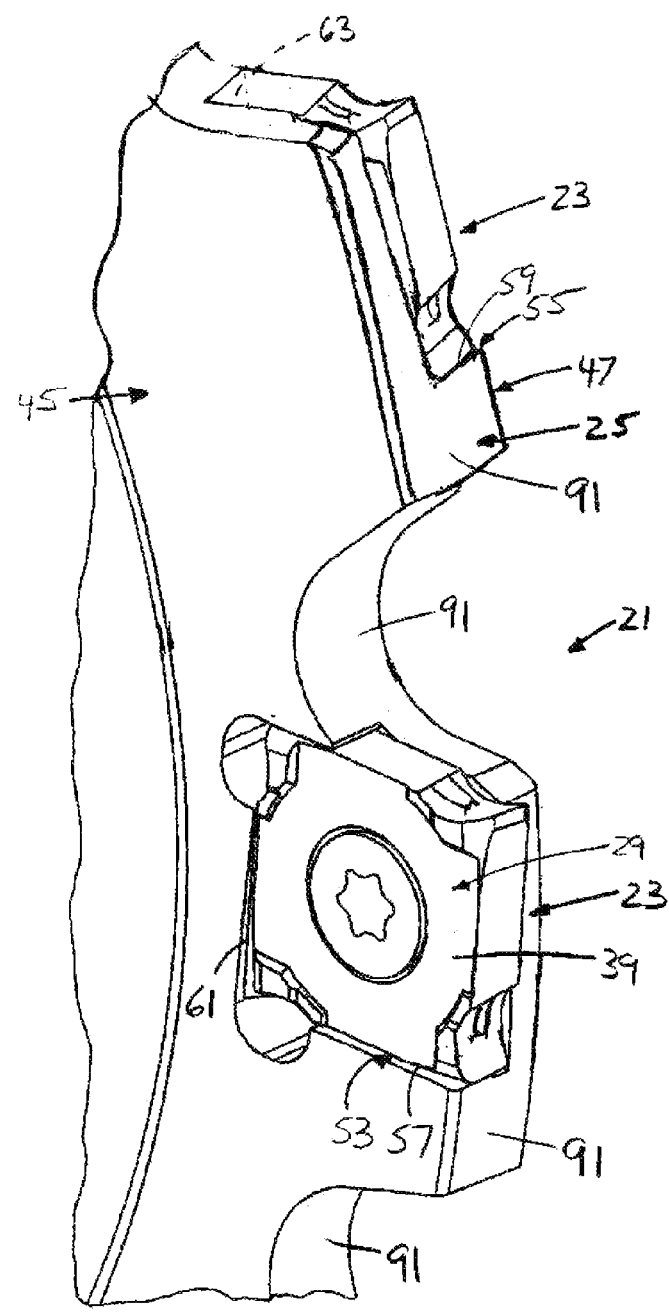
FIG. 1 is a perspective view of a cutting tool according to an aspect of the invention.
Figure 2:
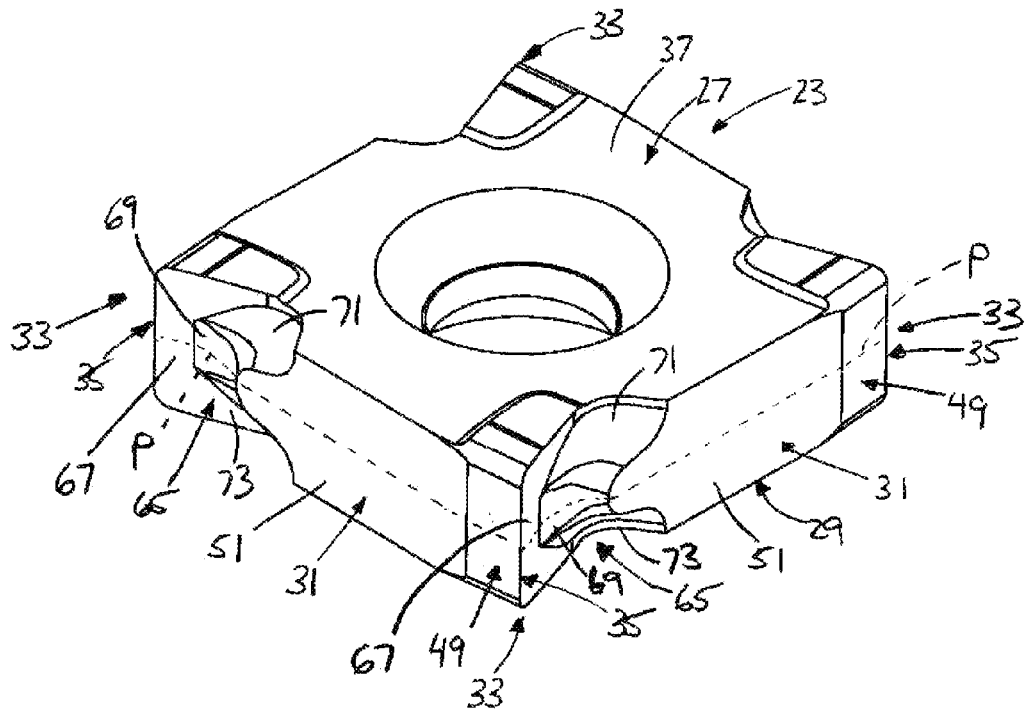
FIG. 2 is a perspective view of a cutting insert according to an aspect of the invention.

A cutting tool 21 comprising a cutting insert 23 to be on-edge mounted to toolholder 25 is shown in FIG. 1. An illustrative insert 23 is shown in FIG. 2 and comprises a first side surface 27, a second side surface 29, and a plurality of edge surfaces 31 between the first and second side surfaces. Each edge surface 31 intersects with another edge surface at a corner 33 and forms a cutting edge 35.

The first and second side surfaces 27 and 29 each have a side insert supporting surface 37 and 39 (not visible in FIG. 2—shown in FIGS. 1 and 4A-4B), respectively, for abutting against an abutment surface 41 or 43, respectively, on first and second sides 45 or 47, respectively, of the toolholder 25. Ordinarily, each side insert supporting surface 37 and 39 and each abutment surface is substantially planar. The insert 23 has reflective symmetry about a central plane P extending through the edge surfaces 31 midway between the first and second side surfaces 27 and 29.

Figure 3:
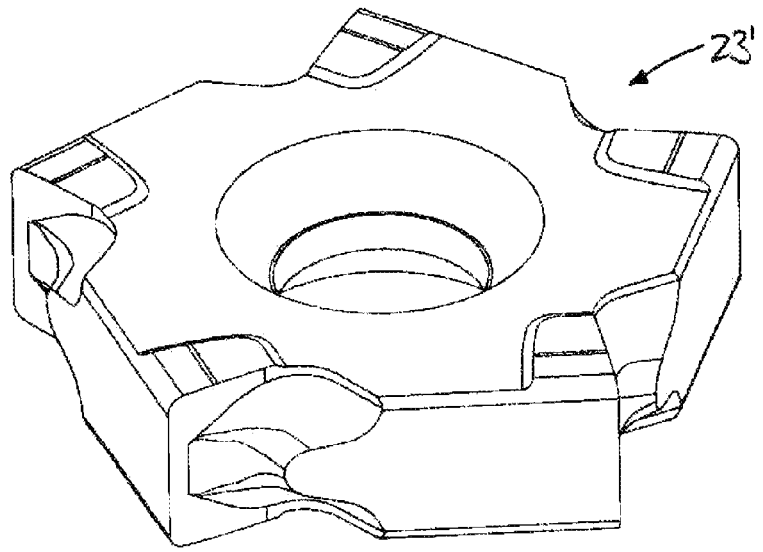
FIG. 3 is a perspective view of a cutting insert according to another aspect of the invention.

FIG. 2 shows an insert 23 of a type that can be on-edge mounted to a toolholder 25 as shown in FIG. 1. The illustrated insert 23 has four edge surfaces 31, however, the insert may have a different number of edge surfaces. For example, FIG. 3 shows an insert 23' of a type that comprises five edge surfaces. More, or fewer, edge surfaces can be provided in other aspects of the invention. The inserts shown in FIGS. 2 and 3 can be formed by any suitable manufacturing technique. The insert 23 shown in FIG. 2 would ordinarily be formed by a conventional negative pressing operation, while the insert 23' shown in FIG. 3 might be better formed by a cross-pressing operation.

In the insert 23 of FIG. 2, a wiper surface 49 is provided on each edge surface 31 and corresponds to each cutting edge 35. Each wiper surface 49 is provided substantially adjacent a corresponding cutting edge 35 and follows the cutting edge during a cutting operation.

In the insert of FIG. 2, an edge insert supporting surface 51 is provided on each edge surface 31 and ordinarily forms a non-zero angle with a plane of the wiper surface 49. The edge insert supporting surface 51 is provided to support the insert 23 in a pocket 53 or 55 provided on the first or second sides 45 or 47, respectively, of the toolholder 25 by abutting an edge abutment surface 57 of the pocket 53 or an edge abutment surface 59 of the pocket 55. The pockets 53 and 55 are defined, in part, by the abutment surfaces 41 and 43, respectively. Ordinarily, as seen in FIG. 1, the insert 23 is supported in the pocket 53 by two edge insert supporting surfaces 51 abutting two edge insert abutment surfaces 57 and 61, which also define, in part, the pocket 53, and by the side insert supporting surface 37 on the first side 27 of the insert abutting the abutment surface 41. The insert 23 is ordinarily supported in the pocket 55 by two edge insert supporting surfaces 51 abutting two edge insert abutment surfaces 59 and 63 (partially shown in phantom in FIG. 1), which also define, in part, the pocket 55, and by the side insert supporting surface 39 on the second side 29 of the insert abutting the abutment surface 43.

In the insert of FIG. 2, a chipbreaker 65 is provided on each edge surface 31 and corresponds to each cutting edge 35. The chipbreaker 65 can include a recess 67 beneath the cutting edge 35, i.e., facing forward in a direction of movement of the cutting tool 21, and a portion 69 projecting toward the cutting edge. The projecting portion 69 defines first and second chip deflecting recesses 71 and 73 between the projecting portion and the first and second side surfaces 27 and 29, respectively. In this way, chips can be deflected by the chipbreaker regardless whether the side insert supporting surface 37 or the side insert supporting surface 39 abuts the abutment surface 41 or 43, respectively. The recesses 71 and 73 shown in FIG. 2 can be more rounded to better facilitate chip flow. The insert of FIG. 3, for example, shows more rounded shapes defining the chipbreaker and related structures.

Ordinarily, a width of each projecting portion 69 is narrower than a length LC of its corresponding cutting edge 35. A width of each projecting portion 69 is also ordinarily narrower than a distance D between each side insert supporting surface.

Figure 5:
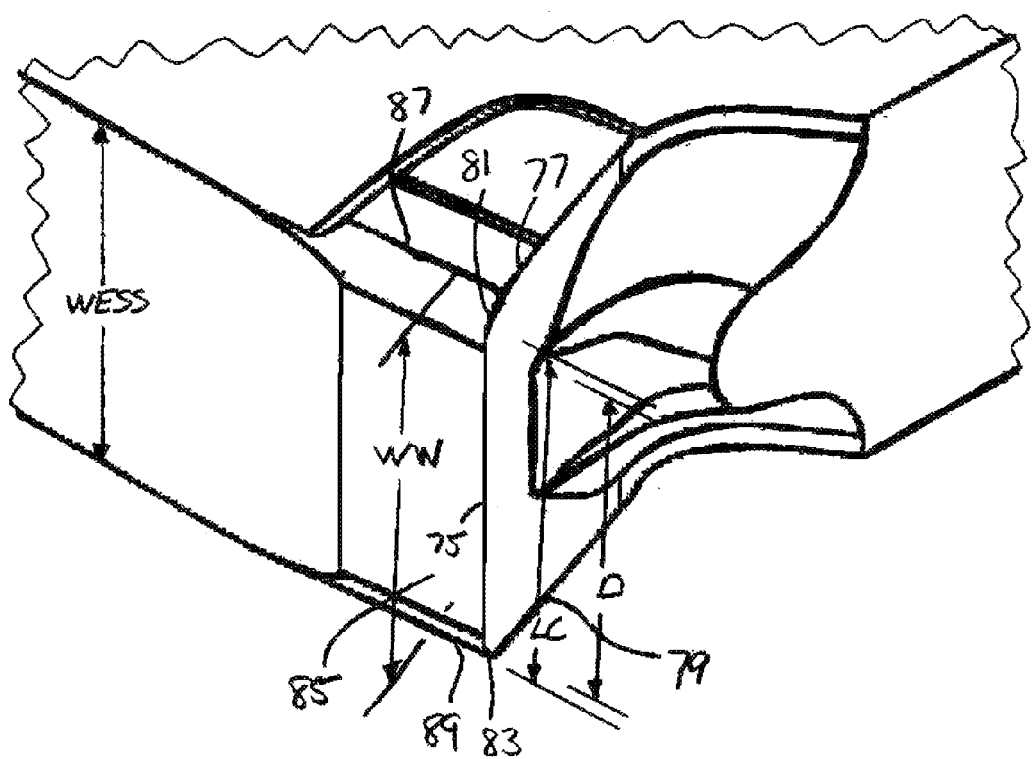
FIG. 5 is an enlarged view of a portion of FIG. 2.

As seen in FIG. 5, which shows an enlarged view of a portion of the insert of FIG. 2, a length LC of each cutting edge 35 can be greater than a distance D between each side insert supporting surface 37 and 39. A width WW between outermost portions of lateral portions 87 and 89 of the wiper surfaces 49 can be substantially as great as, and is ordinarily wider than, the length LC of a corresponding cutting edge, and a width WESS of each edge supporting surface 51 is ordinarily substantially as great as the distance D between each side insert supporting surface 37 and 39.

In the insert of FIGS. 2 and 5, each cutting edge 35 comprises a central portion 75 and two lateral portions 77 and 79 on opposite ends of the central portion. Each lateral portion 77 and 79 can be continuous with the central portion 75, such as by merging into the central portion at a curved corner 81 and 83, respectively. The lateral portions 77 and 79 ordinarily comprise a portion that functions as a cutting edge adjacent the central portion 75 and that has a relatively sharp radius (R1 and R1' in FIGS. 7A and 7B) and a portion that is not used for cutting that ordinarily has a larger radius (R2 in FIGS. 7A and 7B). The length LC of the cutting edge 35 can be considered to be that portion of the edges 75, 77, and 79 between the transition from the relatively sharp radiused portions of lateral portions 77 and 79 to the larger radiused portions. A wiper 49 can be provided and can include a central wiper surface 85 that can trail the central portion 75 of the cutting edge 35 and lateral wiper surfaces 87 and 89 that can trail the lateral portions 77 and 79, respectively, of the cutting edge. The lateral wiper surfaces 87 and 89 can have a generally greater extension behind the lateral portions 77 and 79 than the central wiper surface 85 has behind the central portion 75. The central portion 75 of the cutting edge 35 is ordinarily perpendicular to planes of the first and second side surfaces 27 and 29. The reference to planes of the first and second side surfaces, and to planes, generally, does not mean that the surfaces are necessarily planar, as they may have other shapes. The planes of the surfaces can be merely reference planes having some relationship to the surfaces. Ordinarily, the planes of the surfaces will be parallel to the central plane P.

In the cutting tool 21 shown in FIG. 1, the toolholder 25 has first and second sides 45 and 47 and a peripheral surface 91 between the first and second sides. The toolholder 25 has at least two pockets 53 and 55. The first pocket 53 extends inwardly from the first side 45 of the toolholder 25 and the peripheral surface 91 without reaching the second side 47 of the toolholder. The second pocket 55 extends inwardly from the second side 47 and the peripheral surface 91 of the toolholder 25 without reaching the first side 45 of the toolholder. Additional pockets are ordinarily provided on the first and second sides 45 and 47. Each pocket 53 and 55 carries an on-edge mounted cutting insert 23, ordinarily with at least two edge insert supporting surfaces 51 abutting two corresponding edge abutment surfaces in the pockets. An insert 23 is mounted in the pocket 53 so that the side insert supporting surface 37 on the first side surface 27 contacts the abutment surface 41 on the first side 45 of the toolholder 25, and an insert is mounted in the pocket 55 so that the side insert supporting surface 39 on the second side surface 29 contacts the abutment surface 43 on the second side 47 of the toolholder 25.

Figure 4B:
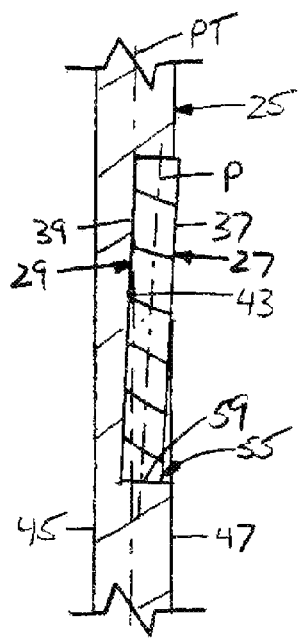
FIG. 4B is a cross-sectional view taken at Section 4B-4B of FIG. 1.
Figure 4A:
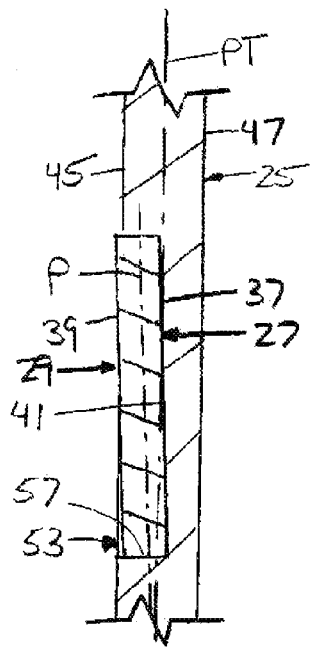
FIG. 4A is a cross-sectional view taken at Section 4A-4A of FIG. 1.

As seen in FIGS. 4A and 4B, the first insert abutment surface 41 and the second insert abutment surface 43 are ordinarily non-parallel to each other and to a central plane PT of the toolholder. The edge abutment surfaces 57 and 59 are also ordinarily non-parallel, and the edge abutment surfaces 61 and 63 are also ordinarily non-parallel. If orientation of the inserts 23 seated in pockets 53 and 55 is such that their cutting edges are non-parallel, the inserts will ordinarily form a groove that does not have a flat bottom.

Figure 6:
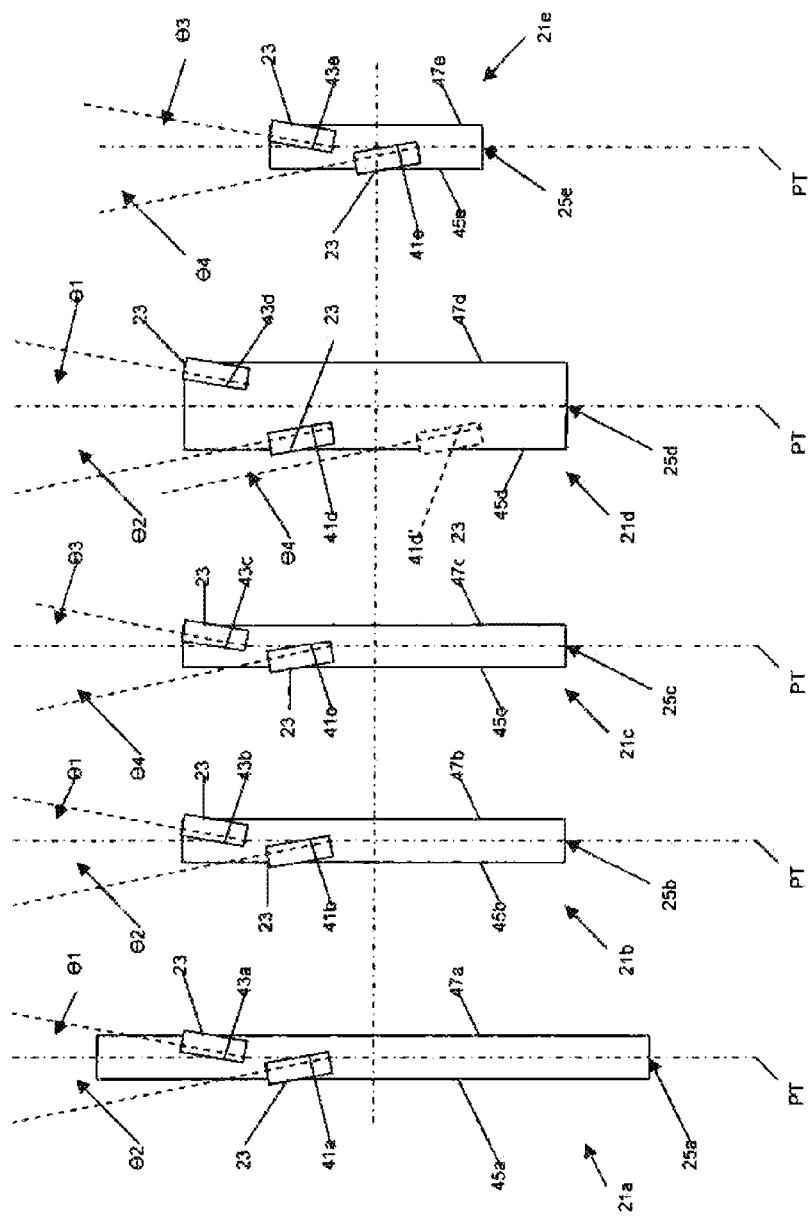
FIG. 6 is a schematic view of a family of cutting tools according to an aspect of the present invention.

FIG. 6 shows a family of rotating cutting tools 21a-21e. The family comprises at least two toolholders 25a-25e having different diameters. Each toolholder 25a-25e comprises a first side 45a-45e and a second side 47a-47e, the first side and the second side being substantially perpendicular to an axis A of rotation of the toolholder. At least one insert abutment surface 41a-41e and 43a-43b is provided on each of the first side 45a-45e and the second side 47a-47e, respectively. The insert abutment surfaces on the first side and the second side of each toolholder are substantially mirror images of each other, and the insert abutment surfaces on each of the first side and the second side of each toolholder 25a-25e are substantially identical to the insert abutment surfaces on each other one of the at least two toolholders.

A plurality of identical inserts 23 is mounted on each of the at least two toolholders 25a-25e. As seen in, e.g., FIG. 2, each insert 23 has a first side surface 27, a second side surface 29, and a plurality of edge surfaces 31 between the first and second side surfaces, each edge surface intersecting with another edge surface at a corner 33 and forming a cutting edge 35. The first and second side surfaces 27 and 29 each have a side insert supporting surface 37 and 39, respectively, for abutting against one of the abutment surfaces 41a-41e and 43a-43e.

As seen in FIG. 6, for each toolholder 25a-25e, the insert abutment surfaces 41a-41e and 43a-43e on the first and second sides 45a-45e and 47a-47e define an angle, e.g., $\Theta1$, $\Theta2$, $\Theta3$, or $\Theta4$, with a plane PT perpendicular to the axis of rotation of the toolholder. The angle defined by the insert abutment surfaces and the plane perpendicular to the axis of rotation of the toolholder is different for the at least two toolholders having different diameters. For example, the insert abutment surfaces 41a and 43a of the toolholder 25a define angles $\Theta2$ and $\Theta1$ with the plane PT, while the insert abutment surfaces 41e and 43e of the toolholder 25e define angles Θ4 and Θ3 with the plane PT, where Θ4 and Θ3 can be different from the angles Θ2 and Θ1.

Because, in the illustrated cutting tools, the sides of the inserts are used as wipers, a radial force is generated on the insert that tends to deflect the cutting tool. To account for different forces developed in the cutting tool due to different toolholder diameter, according to an aspect of the present invention, with a change in diameter of the cutting tool, the angle of orientation of the insert on the toolholder can be changed. Typically, with a larger diameter cutting tool, the angle of orientation of the insert will be larger. For example, in the case of the cutting tools 21a and 21e, the angles Θ2 and Θ1 defined by the insert abutment surfaces and the plane PT perpendicular to the axis of rotation of the larger diameter toolholder 21a of the at least two toolholders having different diameters are larger than the angles Θ4 and Θ3 defined by the insert abutment surfaces and the plane PT perpendicular to the axis of rotation of the smaller diameter toolholder 21e.

While the insert abutment surfaces will ordinarily form a non-zero angle with the plane PT perpendicular to the axis of rotation of the toolholder, the angle may be 0° for at least one toolholder, e.g., angles Θ4 and/or Θ3 may be 0°. As seen with respect to, for example, the cutting tools 21a and 21b, for at least two different toolholders 23a and 23b having different diameters, the angles Θ2 and Θ1 defined by the insert abutment surfaces 41a and 41b and 43a and 43b and the planes PT perpendicular to the axis of rotation of the toolholders can be the same for the at least two toolholders having different diameters. Within the family of rotating cutting tools 21a-21e, the angle Θ4 and Θ3 defined by the insert abutment surfaces 41e and 43e and the plane PT perpendicular to the axis of rotation of the smallest toolholder 21e differs by approximately 1° from the angle Θ2 and Θ1 defined by the insert abutment surfaces 41a and 43a and the plane PT perpendicular to the axis of rotation of the largest toolholder 21a.

In the family of rotating cutting tools, different toolholders, e.g., 25d and 25a, 25b, 25c, or 25e can have different thicknesses measured between the first surface and the second surface of the toolholders. At least two toolholders, e.g., 25d and 25b or 25c, of the at least two toolholders having different thicknesses can have the same diameter. For toolholders having different thicknesses, the angles Θ2 and Θ1 or Θ4 and Θ3 defined by the insert abutment surfaces and the plane perpendicular to the axis of rotation of the toolholder can be different, as with the toolholders 25c versus 25d, or the same, as with the toolholders 25b versus 25d. Ordinarily, the angle Θ2 and Θ1 defined by the insert abutment surfaces and the plane perpendicular to the axis of rotation of the toolholder is greater for a narrower toolholder, e.g., toolholders 21a and 21b of the at least two toolholders having different thicknesses than for a thicker toolholder, e.g., 25d, of the at least two toolholders having different thicknesses.

Within the family of rotating cutting tools, two or more of the toolholders can have the same diameter, as with the toolholders 21b, 21c, and 21d. For toolholders having the same diameter, the angle Θ2 and Θ1 or Θ4 and Θ3 defined by the insert abutment surfaces and the plane perpendicular to the axis of rotation of the toolholder can be different for the at least two toolholders, as with toolholders 25c versus either 25b or 25d, or the same, as with toolholders 25b and 25d.

Figures 7A, 7B:
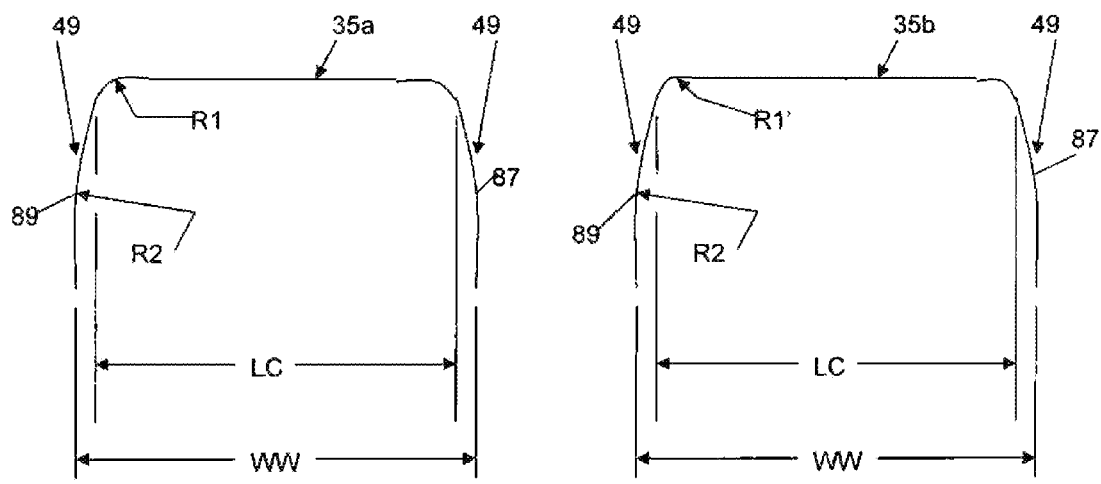
FIGS. 7A and 7B show two inserts with different cutting edge geometries according to an aspect of the present invention.

The plurality of inserts 23 can comprise a family of inserts, wherein each member of the family of inserts has a different geometry than any other member of the family of inserts, such as a cutting edge 35a or 35b having a different shape as seen by comparing the cutting edges of FIGS. 7A and 7B. The cutting edges 35a and 35b differ from each other primarily in that a corner radius R1 is greater for the cutting edge 35a than the corner radius R1' for the cutting edge 35b. The widths LC of the cutting edges 35a and 35b is measured between the points where the corner radii R1 or R1' meet with the edges leading the wiper surfaces 87 and 89, which typically are radiused and have a greater radius R2 than the corner radii of the cutting edges. Causing the widest portion of the insert to be between the distance WW between outermost parts of the wiper surfaces 87 and 89 facilitates causing the wiper surfaces to function as wiper surfaces when the insert is mounted in a toolholder at a non-zero angle relative to a plane perpendicular to an axis of rotation of the toolholder.

In any two cutting tools forming the family of cutting tools, each insert 23 mounted on the two toolholders can be identical, or different inserts from the family of inserts can be mounted on the same toolholders so that, although at least some of the plurality of inserts on the two toolholders are identical, other inserts on the toolholders can be different. Because the shape of the cutting edge and wipers on the insert affects forces in the cutting tool, some insert geometries may be less well suited for use on certain cutting tool diameters than others.

The angle Θ2 or Θ4 defined by the at least one insert abutment surface on the first side of the toolholder and the plane perpendicular to the axis of rotation of the toolholder will often be the same as the angle Θ1 or Θ3 defined by the at least one insert abutment surface on the second side of the toolholder and the plane perpendicular to the axis of rotation of the toolholder, i.e., Θ2=Θ1 and Θ4=Θ3. However, as seen with respect to cutting tool 21d, the angle Θ2 or Θ4 defined by the at least one insert abutment surface on the first side of the toolholder and the plane perpendicular to the axis of rotation of the toolholder can be different from the angle Θ1 defined by the at least one insert abutment surface on the second side of the toolholder and the plane perpendicular to the axis of rotation of the toolholder, i.e., Θ2=Θ1≠Θ4.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in Swedish patent application Nos. 0900285-8 and 0950124-8, from which this application claims priority, are incorporated herein by reference.

What is claimed is:

1. A family of rotating cutting tools, comprising:
   a plurality of toolholders comprising at least two toolholders having different diameters, each toolholder comprising a disk having a first side and a second side, the first side and the second side being disposed at different positions along and substantially perpendicular to an axis of rotation of the toolholder, and at least one insert abutment surface on each of the first side and the second side, the insert abutment surfaces on the first side and the second side of each toolholder being substantially mirror images of each other, and the insert abutment surfaces on each of the first side and the second side of each toolholder being substantially identical to the insert abutment surfaces on each other one of the at least two toolholders;

identical inserts mounted on each of the at least two toolholders, each insert having a first side surface, a second side surface, and a plurality of edge surfaces between the first and second side surfaces, each edge surface intersecting with another edge surface at a corner and forming a cutting edge, wherein the first and second side surfaces each have a side insert supporting surface for abutting against one of the abutment surfaces, and at least one different insert mounted on at least one of the at least two toolholders, wherein, for each toolholder, the insert abutment surfaces on the first and second sides define an angle with a plane perpendicular to the axis of rotation of the toolholder, and the angle defined by the insert abutment surfaces and the plane perpendicular to the axis of rotation of the toolholder is different for the at least two toolholders having different diameters.

2. The family of rotating cutting tools as set forth in claim 1, wherein the angle defined by the insert abutment surfaces and the plane perpendicular to the axis of rotation of the toolholder is greater for a larger diameter toolholder of the at least two toolholders having different diameters than for a smaller diameter toolholder of the at least two toolholders having different diameters.

3. The family of rotating cutting tools as set forth in claim 1, wherein the angle defined by the insert abutment surfaces and the plane perpendicular to the axis of rotation of the toolholder is 0° for at least one toolholder of the at least two toolholders having different diameters.

4. The family of rotating cutting tools as set forth in claim 3, wherein, for each toolholder of at least two toolholders having different diameters of the at least two toolholders having different diameters, the angle defined by the insert abutment surfaces and the plane perpendicular to the axis of rotation of the toolholder is the same for each toolholder of the at least two toolholders having different diameters of the at least two toolholders having different diameters.

5. The family of rotating cubing tools as set forth in claim 1, wherein the angle defined by the insert abutment surfaces and the plane perpendicular to the axis of rotation of a smallest toolholder of the at least two toolholders having different diameters differs by approximately 1° from the angle defined by the insert abutment surfaces and the plane perpendicular to the axis of rotation of a largest toolholder of the at least two toolholders having different diameters.

6. The family of rotating cutting tools as set forth in claim 1, comprising at least two toolholders having different thicknesses measured, for each of the at least two toolholders having different thicknesses, between the first side and the second side.

7. The family of rotating cutting tools as set forth in claim 6, wherein at least two toolholders of the at least two toolholders having different thicknesses have the same diameter.

8. The family of rotating cutting tools as set forth in claim 6, wherein, for each toolholder of the at least two toolholders having different thicknesses, the angle defined by the insert abutment surfaces and the plane perpendicular to the axis of rotation of the toolholder is different for the at least two toolholders having different thicknesses.

9. The family of rotating cutting tools as set forth in claim 6, wherein the angle defined b the insert abutment surfaces and the plane perpendicular to the axis of rotation of the toolholder is greater for a narrower toolholder of the at least two toolholders having different thicknesses than for a thicker toolholder of the at least two toolholders having different thicknesses.

10. The family of rotating cutting tools as set forth in claim 1, wherein at least two toolholders of the plurality of toolholders having different diameters have the same diameter.

11. The family of rotating cutting tools as set forth in claim 10, wherein, for each toolholder of the plurality of toolholders having the same diameter, the angle defined by the insert abutment surfaces and the plane perpendicular to the axis of rotation of the toolholder is different for the at least two toolholders having the same diameter.

12. The family of rotating cutting tools as set forth in claim 1, wherein the identical inserts and the at least one different insert are members of a family of inserts, the identical inserts having a different geometry.

13. The family of rotating cutting tools as set forth in claim 1, wherein each insert mounted on the at least two of the at least two toolholders having different diameters is identical.

14. The family of rotating cutting, tools as set forth in claim 1, wherein, on at least one toolholder of the at least two toolholders having different diameters, the angle defined by the at least one insert abutment surface on the first side of the toolholder and the plane perpendicular to the axis of rotation of the toolholder is the same as the angle defined by the at least one insert abutment surface on the second side of the toolholder and the plane perpendicular to the axis of rotation of the toolholder.

15. The family of rotating cutting tools as set forth in claim 1, wherein, on at least one toolholder of the at least two toolholders having different diameters, the angle defined by the at least one insert abutment surface on the first side of the toolholder and the plane perpendicular to the axis of rotation of the toolholder is different from the angle defined by the at least one insert abutment surface on the second side of the toolholder and the plane perpendicular to the axis of rotation of the toolholder.

* * * * *